United States Patent
Mousa et al.

(10) Patent No.: US 12,360,323 B2
(45) Date of Patent: Jul. 15, 2025

(54) MECHANICAL THERMAL INTERFACE FOR IMPROVED HEAT DISSIPATION IN NETWORK TRANSCEIVERS

(71) Applicant: MELLANOX TECHNOLOGIES, LTD., Yokneam (IL)

(72) Inventors: Jamal Mousa, Haifa (IL); Aziz Mazbar, Nof Hagalil (IL); Nimer Hazin, Ba'ne (IL); Alon Rokach, Haifa (IL); Ayal Shabtay, Haifa (IL); Yuval Ullman, Beit Elazary (IL)

(73) Assignee: Mellanox Technologies, Ltd, Yokneam (IL)

( * ) Notice: Subject to any disclaimer, the term of this patent is extended or adjusted under 35 U.S.C. 154(b) by 281 days.

(21) Appl. No.: 17/967,914

(22) Filed: Oct. 18, 2022

(65) Prior Publication Data
US 2024/0126028 A1  Apr. 18, 2024

(51) Int. Cl.
*G02B 6/42* (2006.01)
*H04B 10/40* (2013.01)

(52) U.S. Cl.
CPC ......... *G02B 6/4269* (2013.01); *G02B 6/4236* (2013.01); *H04B 10/40* (2013.01)

(58) Field of Classification Search
CPC .. G02B 6/4269; G02B 6/4236; G02B 6/4267; G02B 6/4278; G02B 6/4246; H04B 10/40
See application file for complete search history.

(56) References Cited

U.S. PATENT DOCUMENTS

| | | |
|---|---|---|
| 3,972,012 A | 7/1976 | Liu |
| 4,639,829 A | 1/1987 | Ostergren et al. |
| 4,908,695 A | 3/1990 | Morihara et al. |

(Continued)

FOREIGN PATENT DOCUMENTS

| | | |
|---|---|---|
| EP | 2999320 A1 | 3/2016 |
| JP | 2004273924 A | 9/2004 |

(Continued)

OTHER PUBLICATIONS

GE Plastics, "ULTEM PEI Resin", Product Guide, pp. 1-52, Jun. 2003.

(Continued)

*Primary Examiner* — Anthony M Haughton
*Assistant Examiner* — Hung Q Dang
(74) *Attorney, Agent, or Firm* — Meitar Patents Ltd.; Daniel Kligler

(57) ABSTRACT

A transceiver includes, (a) a communication circuit, which is configured to exchange signals between a cable and a communication unit when the transceiver is connected to the communication unit, and (b) a housing, including: (i) a first shell including a substrate having the communication circuit disposed thereon, (ii) a second shell, which is configured to connect with the first shell for encapsulating the communication circuit, the second shell has an opening facing the communication circuit, and (iii) a base plate, which is fitted in the opening and including a first surface having one or more cooling fins formed thereon, and a second surface, opposite the first surface that is facing the communication circuit, the base plate is configured to transfer heat between the communication circuit and the cooling fins.

10 Claims, 3 Drawing Sheets

(56) References Cited

U.S. PATENT DOCUMENTS

| | | |
|---|---|---|
| 5,028,989 A | 7/1991 | Naganuma et al. |
| 5,471,850 A | 12/1995 | Cowans |
| 7,009,284 B2 | 3/2006 | Nakase et al. |
| 7,118,292 B2 | 10/2006 | Miao et al. |
| 7,153,043 B1 * | 12/2006 | Zhang .................. G02B 6/4283 385/92 |
| 7,264,405 B2 | 9/2007 | Ikeuchi |
| 7,359,641 B2 | 4/2008 | Dallesasse et al. |
| 7,440,386 B2 | 10/2008 | Tateyanagi et al. |
| 8,116,633 B2 | 2/2012 | Yasuda et al. |
| 8,333,517 B2 | 12/2012 | Tanobe et al. |
| 8,686,644 B2 | 4/2014 | Wootton |
| 8,870,467 B2 | 10/2014 | Levy et al. |
| 9,016,957 B2 * | 4/2015 | Ben David .......... G02B 6/4269 385/89 |
| 9,325,418 B2 | 4/2016 | Kuroda et al. |
| 9,329,349 B2 | 5/2016 | Ben David et al. |
| 9,620,890 B1 | 4/2017 | Vino et al. |
| 9,935,403 B1 * | 4/2018 | Briant .................. H05K 9/0018 |
| 10,054,375 B2 | 8/2018 | David |
| 10,382,142 B2 * | 8/2019 | Yagisawa .............. H01L 25/167 |
| 11,199,670 B2 * | 12/2021 | Takai .................... G02B 6/4284 |
| 11,283,218 B2 * | 3/2022 | Qiao .................. H01R 13/6592 |
| 11,876,315 B2 * | 1/2024 | Mousa ............... H01R 13/6587 |
| 2002/0175403 A1 | 11/2002 | Sreeram et al. |
| 2005/0068739 A1 | 3/2005 | Arvelo et al. |
| 2005/0075573 A1 | 4/2005 | Park et al. |
| 2005/0168957 A1 | 8/2005 | Kawauchi et al. |
| 2005/0201098 A1 | 9/2005 | Dipenti et al. |
| 2007/0089900 A1 | 4/2007 | Mitamura et al. |
| 2007/0230878 A1 | 10/2007 | Nakazawa et al. |
| 2009/0097802 A1 | 4/2009 | Tamura et al. |
| 2010/0074581 A1 | 3/2010 | Tanobe et al. |
| 2022/0158390 A1 * | 5/2022 | Lee .................... H01R 13/6594 |

FOREIGN PATENT DOCUMENTS

| | | |
|---|---|---|
| JP | 2005322819 A | 11/2005 |
| JP | 2008268587 A | 11/2008 |
| JP | 2010122311 A | 6/2010 |

OTHER PUBLICATIONS

Laird Technologies, Inc., "Tputty 607", Data Sheet, pp. 1-3, years 1995-2019.
NYRStar, "Zinc Die Casting Alloys (Zamak)", Technical Data Sheet, pp. 1-4, Nov. 2020.

* cited by examiner

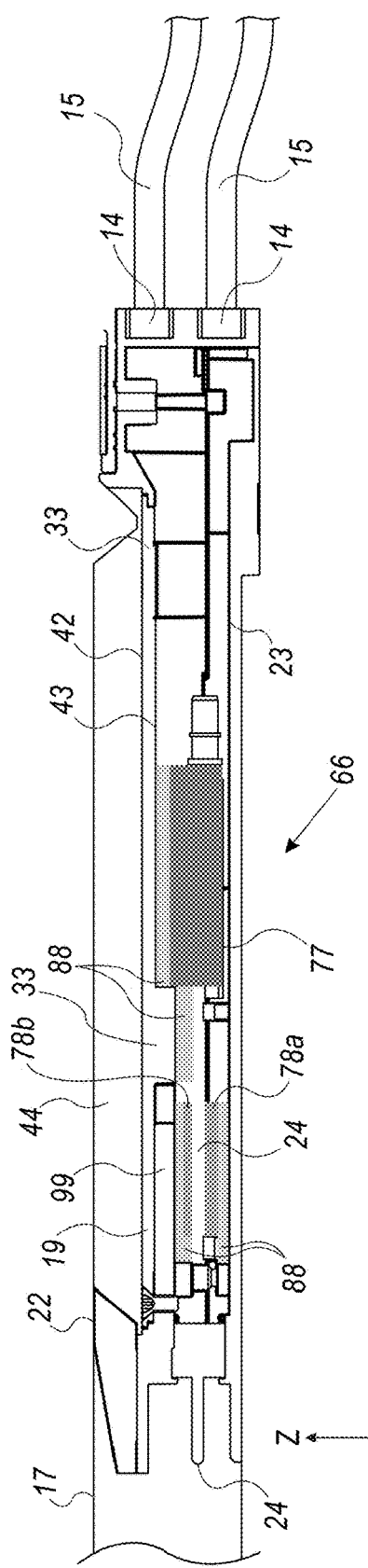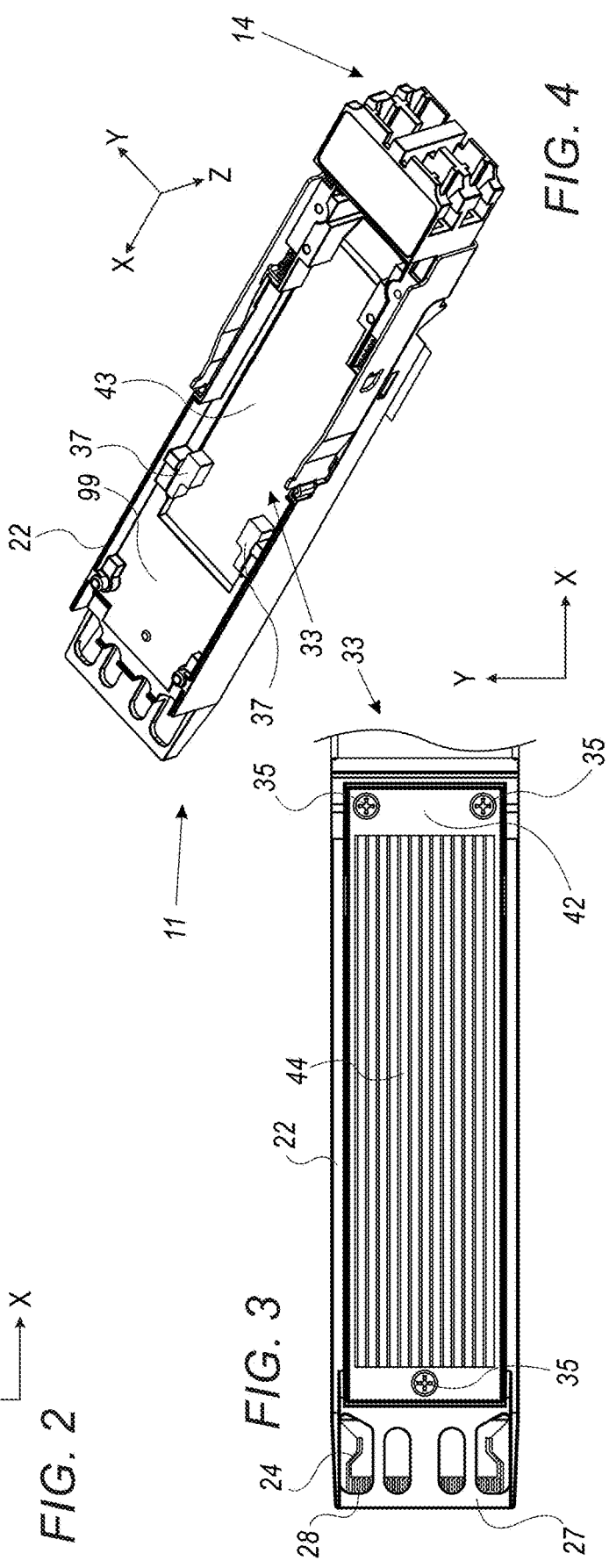

MECHANICAL THERMAL INTERFACE FOR IMPROVED HEAT DISSIPATION IN NETWORK TRANSCEIVERS

FIELD OF THE INVENTION

The present invention relates generally to network transceivers, and particularly to techniques for improving heat dissipation in network transceivers.

BACKGROUND OF THE INVENTION

Various techniques dissipating heat produced in network transceivers are known in the art.

SUMMARY OF THE INVENTION

An embodiment of the present invention that is described herein provides a transceiver, including (a) a communication circuit, which is configured to exchange signals between a cable and a communication unit when the transceiver is connected to the communication unit, and (b) a housing, including: (i) a first shell including a substrate having the communication circuit disposed thereon, (ii) a second shell, which is configured to connect with the first shell for encapsulating the communication circuit, the second shell has an opening facing the communication circuit, and (iii) a base plate, which is fitted in the opening and including a first surface having one or more cooling fins formed thereon, and a second surface, opposite the first surface that is facing the communication circuit, the base plate is configured to transfer heat between the communication circuit and the cooling fins.

In some embodiments, the base plate includes a base plate assembly, and the cooling fins include zipper fins, which are coupled to the first surface and are configured to dissipate the heat generated by the communication circuit while exchanging the signals. In other embodiments, the cooling fins include extruded fins, which are formed together with the first surface, and are configured to dissipate the heat generated by the communication circuit while exchanging the signals. In yet other embodiments, a first thermal conductivity of the base plate is larger than a second thermal conductivity of the second shell.

In some embodiments, the signals include optical signals and electrical signals, and the communication circuit includes one or more electro-optical (EO) transducers configured to convert between the optical signals and the electrical signals. In other embodiments, the transceiver includes thermal interface material disposed between at least one of the EO transducers and at least the base plate. In yet other embodiments, the signals include electrical signals, and the communication circuit includes one or more integrated circuits (ICs) configured to exchange the electrical signals between the cable and the communication unit.

In some embodiments, the transceiver includes one or more additional substrates configured to receive the ICs mounted thereon, and to exchange the electrical signals (i) between the ICs, and (ii) between at least one of the ICs and the communication unit. In other embodiments, the transceiver includes thermal interface material disposed between: (i) at least one of the ICs, and (ii) at least one of (a) the base plate, (b) the first shell, and (c) the second shell. In yet other embodiments, the transceiver includes a fastening mechanism that, when the base plate is fitted in the opening, is configured to attached and detach between the base plate and the second shell.

There is additionally provided, in accordance with an embodiment of the present invention, a method for producing a transceiver, the method includes disposing, on a substrate of a first shell, a communication circuit for exchanging signals between a cable and a communication unit when the transceiver is connected to the communication unit. One or more cooling fins are disposed on a first surface of a base plate. The base plate is fitted in an opening of a second shell, the opening is facing the communication circuit, and a second surface of the base plate is facing the communication circuit for transferring heat between the communication circuit and the cooling fins. The first shell and the second shell are connected for assembling a housing that encapsulates the communication device.

In some embodiments, disposing the one or more ICs includes mounting the one or more ICs on one or more additional substrates, and disposing the one or more additional substrates on the substrate of the first shell.

The present invention will be more fully understood from the following detailed description of the embodiments thereof, taken together with the drawings in which:

BRIEF DESCRIPTION OF THE DRAWINGS

FIG. 2 is a schematic, sectional view of the NTI of FIG. 1, in accordance with an embodiment of the present invention;

FIG. 3 is a schematic, top view of the NTI of FIG. 1, in accordance with an embodiment of the present invention;

FIG. 4 is a schematic, bottom view of the NTI of FIG. 1, in accordance with an embodiment of the present invention;

DETAILED DESCRIPTION OF EMBODIMENTS

Overview

Figure 1:
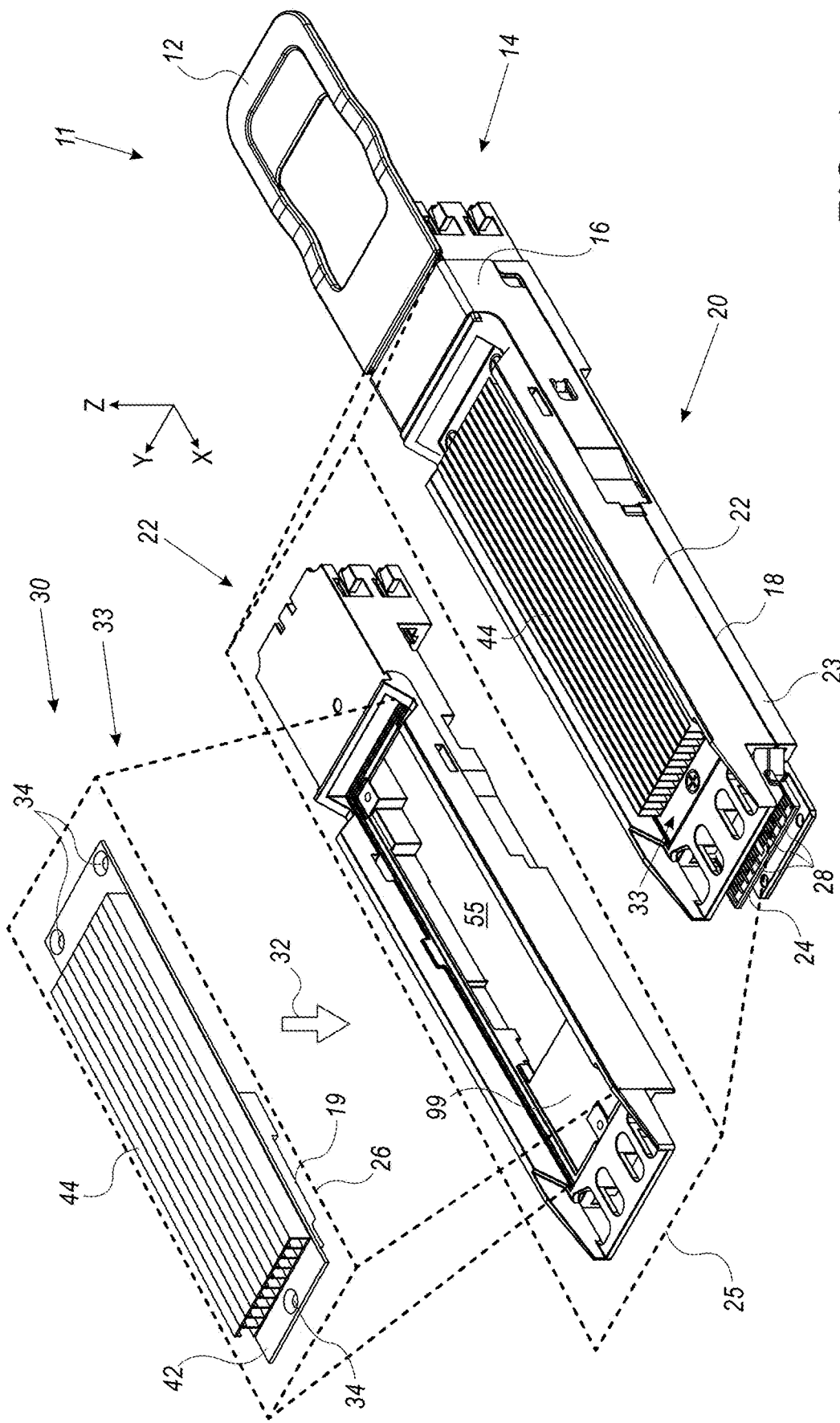
FIG. 1 is a schematic, pictorial illustration of a network transceiver interconnect (NTI) used in a communication network, in accordance with an embodiment of the present invention.

Communication systems, such as electrical and electro-optical (EO) communication systems, comprise network transceiver interconnects (NTIs) configured to transmit and receive signals between switches and other devices of the communication system.

In EO communication systems, some of the NTIs comprise EO interconnects having (i) one or more EO transducers configured to convert between electrical and optical signals, and (ii) integrated circuits (ICs) and other devices (e.g., passive components) configured to perform processing and other operations on the electronic signals. Not that some NTIs are transmitting and receiving only electronic signals, and therefore, have the aforementioned ICs (and other devices) but not the EO transducers described above. In both configurations, the EO transducers, ICs and some of the other devices generate heat during the operation of the NTI. Moreover, high-speed data communication systems used in data centers and in big data applications, such as in cloud computing and machine learning applications, are driving rapid growth of traffic inside data center networks and between end users The increased data rate and bandwidth of communication systems increases the amount of heat generated by the devices thereof, and it is important to dissipate the heat in order to meet the operational requirements and prevent overheating-related failures.

Embodiments of the present invention that are described hereinbelow provide techniques for improving the heat dissipation in NTIs of communication systems.

In some embodiments, in an EO communication unit of a communication system, a network transceiver interconnect (NTI), also referred to herein as a transceiver or an EO interconnect, comprises a communication circuit configured to exchange signals between a cable (e.g., an optical cable) and the communication unit when the system operates, and transceiver is connected to the communication unit. In the present example, the communication circuit comprises EO transducers, ICs and additional components.

In some embodiments, the NTI comprises a housing configured to encapsulate the components of the NTI and to dissipate the heat from the heat-generating devices (e.g., EO transducers and ICs) of the communication circuit. The housing comprises a lower shall (also referred to herein as a first shell) having a substrate configured to receive the communication circuit disposed thereon.

In some embodiments, the housing comprises an upper shell (also referred to herein as a second shell) configured to connect with the lower shell for encapsulating the components of the communication circuit. The upper shell has an opening facing the communication circuit, and the housing further comprises a base plate assembly, which is fitted in the opening.

In some embodiments, the base plate assembly has first and second surfaces facing one another. An array of cooling fins is disposed on the first surface, and the second surface that is opposite the first surface, is facing at least some of the heat-generating components of the communication circuit. The cooling fins may comprise zipper fins, extruded fins, or any other suitable type of Fins. Note that in case of extruded fins, the base plate may be extruded together with the fins in one piece so that the base plate may comprise a single unit rather than an assembly. In all these configurations, the base plate is configured to transfer the heat between the heat-generating components of the communication circuit and the cooling fins, so as to dissipate the heat away from the NTI.

In some embodiments, the NTI comprises optical connectors and electrical connectors disposed at first and second ends of the NTI, respectively. Each optical connector is configured to exchange optical signals between an optical cable and the EO transducers of the NTI. Each electrical connector is configured to exchange electrical signals between ICs of the NTI and other components (external to the NTI), e.g., a switching application-specific IC (ASIC), of the communication system.

In some embodiments, the NTI comprises thermal interface material (TIM) disposed between at least some of the heat-generating components and the cooling plate. The TIM is configured to improve the thermal coupling between the heat-generating components and the cooling plate, and thereby, to improve the heat dissipation away from the communication circuit and the assembly of the respective NTI.

The disclosed techniques improve the bandwidth of communication systems by improving the heat dissipation from electrical and/or electro-optical network transceiver interconnects (NTIs) while retaining a small form factor of the NTIs.

System Description

FIG. 1 is a schematic, pictorial illustration of a network transceiver interconnect (NTI) 11 used in a communication network (not shown), in accordance with an embodiment of the present invention.

In some embodiments, NTI 11 comprises a housing 20 comprising a lower shell 23 and an upper shell 22 coupled at an interface 18. Housing 20 further comprises a base plate 33 adapted to be fitted into an opening 55 in shell 22, as will be described in detail below, and cooling fins 44 formed on or coupled to base plate 33.

In some embodiments, NTI 11 comprises connectors 14 and 28 configured to connect between (a) NTI 11 and (b) (i) one or more cables (shown in FIG. 2 below), and (ii) a communication unit, such as a network switch (shown in FIG. 2 below), respectively. In the present example, the communication network comprises an electro-optical (EO) communication system, and NTI 11 comprises an EO-based NTI. In this example configuration, connectors 14 are configured to connect between one or more optical cables and NTI 11 for exchanging optical signals therebetween, and connectors 28 are configured to connect between NTI 11 and the communication unit for exchanging electrical signals therebetween. In other embodiments, the communication network comprises an electronic communication network having passive and/or active copper cables, so that connectors 28 are positioned at both ends of NTI 11 and are configured to connect between one or more of the passive and/or active copper cables and NTI 11 for exchanging electrical signals therebetween.

In some embodiments, NTI 11 comprises a substrate, in the present example a circuit board (CB) 24 having connectors 28 implemented as pads of the CB. Note that CB 24 is configured to conduct the electrical signals, inter alia, between NTI 11 and the communication unit, and between other components of NTI 11 as will be shown in FIG. 2 below. In the present example, the electrical and optical signals are conducted through NTI 11 along the X-axis of an XYZ coordinate system.

In some embodiments, NTI 11 comprises a handle 12 adapted for plugging NTI 11 into the communication unit, and also, for unplugging NTI 11 from the communication unit. NTI 11 comprises an unlocking mechanism 16 configured to unlock the mechanical connection between a communication unit (shown in FIG. 2 below) and housing 20.

Reference is now made to insets 25 and 26 showing shell 22 and base plate 33. In some embodiments, shell 22 has an opening 55 and a shelf 99 adapted to receive base plate 33 mounted thereon.

In some embodiments, base plate 33 is shaped to fit in opening 55, so that a section 19 of base plate 33 is disposed over shelf 99. NTI 33 further comprises a fastening mechanism configured to attach and detach between base plate 33 and shell 22. In the present example, the fastening mechanism comprises bores 34 (formed through base plate 33) and screws (not shown) for attaching and detaching between base plate 33 and shell 22.

In some embodiments, NTI 11 comprises a base plate assembly 30 having base plate 33 and cooling fins 44 coupled to an upper surface 42 of base plate 33. In the present example, cooling fins 44 comprise zipper fins (shown in more detail in FIG. 5 below), which are formed using a die casting process, and are configured to dissipate the heat generated by devices of a communication circuit (shown in FIG. 2 below) while the communication circuit is exchanging the electrical and optical signals described above.

In other embodiments, cooling fins 44 comprise extruded cooling fins, which are formed together with base plate 33 using an extrusion process or any other suitable formation process. In such embodiments, base plate 33 and cooling fins 44 are combined in one part, and therefore, are not considered an assembly.

In some embodiments, base plate 33 is moved relative to shell 22 in a direction 32 (e.g., parallel to the Z-axis of the XYZ coordinate system) in order to be fitted over opening 55 and shelf 99. In such embodiments, section 19 of base plate 33 is mounted on shelf 99, and the aforementioned screws are fastened through bores 34 for attaching base plate 33 to shell 22. Note that base plate 33 (together with cooling fins 44) may be detached from shell 22 by releasing the screws from bores 34.

In some embodiments, detaching base plate 33 from shell 22 allows a user of NTI 11 to: (i) replace the cooling apparatus (e.g., base plate 33 and cooling fins 44) of NTI 11 (e.g., for maintenance in the field), and (ii) replace faulty components of NTI 11 without decoupling between shells 22 and 33.

The configuration of shell 22 and base plate assembly 30 are provided by way of example, and in other embodiments, at least one of shell 22, base plate 33 may cooling fins 44 may have any other suitable size and shape.

FIG. 2 is a schematic, sectional view of NTI 11, in accordance with an embodiment of the present invention.

In some embodiments, NTI 11 is connecting between (i) one or more cables 15, in the present example, optical cable connected to NTI 11 via connectors 14, and (ii) communication unit 17 connected to connectors 28 (shown in FIG. 1 above) of CB 24, in the present example a network switch or any other suitable unit.

In some embodiments, NTI 11 comprises communication circuit 66 comprising one or more EO transducers 77 configured to convert between the optical signals (exchanged with cables 15) and the electrical signals (exchanged with communication unit 17). Communication circuit 66 further comprises multiple integrated circuits (IC) devices, referred to herein as ICs 78, mounted on both sides of CB 24.

In some embodiments, CB 24 and EO transducer 77 are disposed over shell 23, and because EO transducer 77 and ICs 78 generate heat when exchanging the signals, NTI 11 comprises thermal interface material (TIM) 88 disposed between (a) the shells and/or base plate 33, and (b) EO transducer 77 and ICs 78. In the present configuration, TIM 88 is disposed between: (i) shell 23 and lower ICs 78a, (ii) shelf 99 and upper ICs 78b, and optionally, also between CB 24 and shelf 99 and/or between CB 24 and base plate 33, (iii) EO transducer 77 and a lower surface 43 of base plate 33, and optionally, also between shell 23 and EO transducer 77.

In some embodiments, upper surface 42 of base plate 33 is coupled with cooling fins 44 using a bonding process (e.g., soldering, welding, and gluing processes), and/or mechanical assembling and section 19 of base plate 33 is mounted on shelf 99 of shell 22.

In some embodiments, TIM 88 comprises any suitable type of TIM, such as but not limited to TIM-PUTTY family of products (e.g., Laird T-Putty 607™), supplied by Graco (Minneapolis, MN 55413). At least one of shells 22 and 23 comprises any suitable material, such as but not limited to a zinc-based alloy which is alloyed with suitable elements such as aluminum, cadmium, copper and additional additives, also referred to herein as ZAMAK supplied by Nyrstar (Zinkstraat 1 2490, Balen, Antwerp, Belgium).

In some embodiments, base plate 33 comprises aluminum and/or copper, and/or an alloy thereof, and cooling fins 44 may comprise similar materials or other materials having a similar or equal coefficient of thermal expansion (CTE) (e.g., between about 20 ppm/° C. and 24 ppm/° C.) to that of the materials of base plate 33, so as to prevent mechanical stress therebetween and possible damage during the thermal cycles of NTI 11 caused by the heat generated by the aforementioned components of communication circuit 66. Note that typically base plate 33 and cooling fins 44 have a thermal conductivity of about 160 W/mK higher than that of shells 22 and 33, e.g., about 100 W/mK, so as to dissipate the generated heat away from NTI 11.

The configuration of NTI 11 shown in FIGS. 1 and 2, is provided by way of example, in order to illustrate certain problems that are addressed by embodiments of the present disclosure and to demonstrate the application of these embodiments in enhancing the performance of such network transceiver interconnects. Embodiments of the present disclosure, however, are by no means limited to this specific sort of example NTIs, and the principles described herein may similarly be applied to other sorts of and configurations of transceiver connectors, such as but not limited to electronic-based NTIs and EO-based NTIs used in suitable communication systems and other sorts of electronic devices and systems.

FIG. 3 is a schematic, top view of NTI 11, in accordance with an embodiment of the present invention.

In some embodiments, base plate 33 is attached (together with cooling fins 44) to shell 22 using screws 35 that are fastened through bores 34 (shown in inset 26 of FIG. 1 above).

In some embodiments, CB 24 and connectors 28 are shown through openings in a section 27 of shell 22.

FIG. 4 is a schematic, bottom view of NTI 11, in accordance with an embodiment of the present invention.

In some embodiments, surface 43 of base plate 33 is placed over shelf 99 and the opening (e.g., opening 55 shown in inset 25 of FIG. 1 above) of shell 22. In such embodiments, surface 43 is facing the heat-generating devices (e.g., EO transducer 77 and ICs 78) of communication circuit 66, so as to dissipate the heat away from NTI 11.

In some embodiments, base plate 33 may have some sections, such as sections 37, which stand out compared to surface 43, so as to improve the dissipation of heat from EO transducer 77 and ICs 78 of communication circuit 66. Moreover, the heat dissipation may be carried out also from CB 24, which is connected to ICs 78 (and receive heat therefrom) and may also generate heat when conducting the electrical signals between ICs 78 and also between at least one of ICs 78 and connectors 28.

Figure 5:
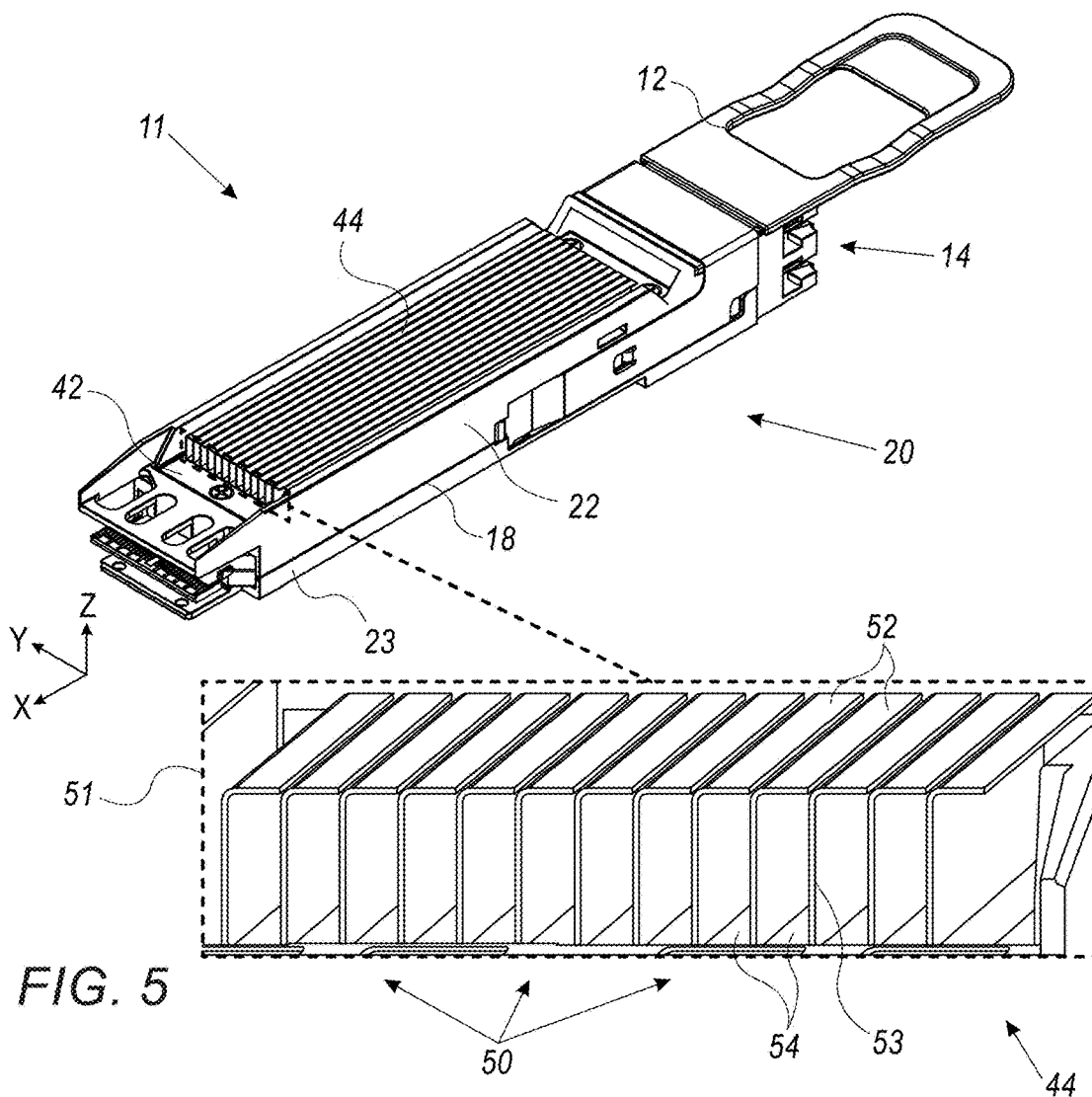
FIG. 5 is a schematic, side view of cooling fins of the NTI of FIG. 1, in accordance with an embodiment of the present invention.

FIG. 5 is a schematic, side view of cooling fins coupled with base plate 33 of NTI 11, in accordance with an embodiment of the present invention.

Reference is now made to an inset 51 showing the side view of cooling fins 44.

In some embodiments, cooling fins 44 comprise an array of multiple c-shaped elements (CSEs) 50, arranged in a face-to-back configuration. Each CSE 50 comprises: (i) a lower section 54 coupled to upper surface 42 of base plate 33, (ii) an upper section 52 configured to dissipate the heat to the surrounding environment (e.g., air), and (iii) a section 53 connecting between sections 52 and 54. Note that each CSE 50 serves as a cooling fin and the different numeral is used for the sake of the description and for conceptual clarity.

In some embodiments, sections 52 and 54 of abutted CSEs 50 are placed in contact with one another. In other embodiments, at least two of sections 52 and 54 of the abutted CSEs 50 may have a predefined spacing between one another.

In alternative embodiments, cooling fins 44 may have any other suitable type of and structure of fins, arranged on surface 42 of base plate 33 using any suitable configuration.

Figure 6:
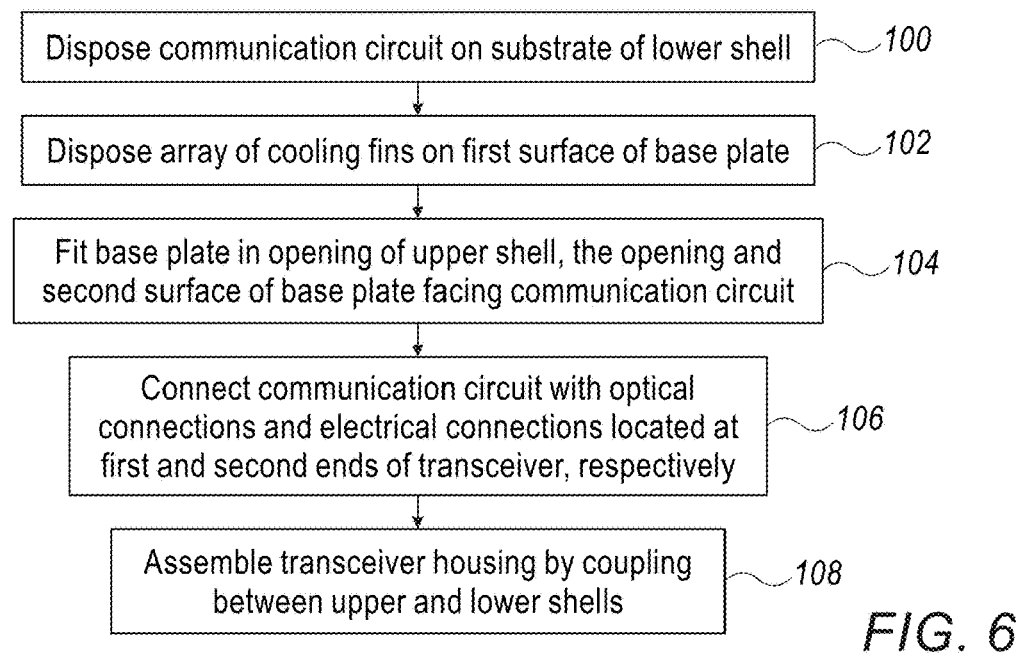
FIG. 6 is a flow chart that schematically illustrates a method for producing the NTI shown in FIGS. 1-5, in accordance with an embodiment of the present invention.

FIG. 6 is a flow chart that schematically illustrates a method for producing NTI 11 shown in FIGS. 1-5, in accordance with an embodiment of the present invention.

The method begins at a communication circuit disposing step 100, with disposing TIM 88 and mounting on one or more surfaces of shell 23: (i) CB 24 having ICs 78a and 78b mounted thereon, and (ii) one or more EO transducers 77, as described in detail in FIG. 2 above.

At a cooling fin coupling step 102, the array of CSEs 50 of cooling fins 44 is coupled to surface 42 of base plate 33 (e.g., using a suitable soldering or bonding process), as described in detail in FIGS. 1-3 and 3 above.

In other embodiments, base plate 33 and fins 44 may be produced together as a single part, and the method will be altered as will be described hereinafter.

At a base-plate fitting step 104, base plate 33 is fitted over shelf 99 and opening 55 of shell 22, such that opening 55, at least surface 43 of base plate 33, and (in the present configuration) shelf 99, are facing the heat-generating devices of communication circuit 66 (e.g., (i) CB 24 and ICs 78b mounted thereon, and (ii) one or more EO transducers 77) for dissipating the heat therefrom, as described in detail in FIG. 2 above.

In other embodiments, base plate 33 and fins 44 may be produced together as a single part using a die casting process and an extrusion process for shaping cooling fins 44. In such embodiments, step 102 may be omitted, and the method of FIG. 6 may proceed directly from step 100 to step 104.

At an interconnecting step 106, the devices of communication circuit 66 are connected to the optical and electrical connectors of NTI 11. More specifically, (i) ICs 78a and 78b are electrically connected to connectors 28 by being mounted on CB 24, and (ii) one or more EO transducers 77 are optically connected to connectors 14, e.g., via suitable wave guides (not shown in FIG. 2 above) of NTI 11.

At an assembly step 108 that concludes the method, housing 20 is assembled by disposing the TIM on suitable surfaces shown in FIG. 2 above, and coupling between shells 22 and 23.

In some embodiments, base plate 33 and cooling fins 44 are already coupled to shell 22, as described in step 104. In alternative embodiments, base plate 33 and cooling fins 44 may be coupled to shell 22 after step 108, using screws 35 fastened through bores 34 shown and described above in FIGS. 3 and 1, respectively.

It is note that the steps of the method of FIG. 6 are simplified for the sake of conceptual clarity and are provided by way of example. Embodiments of the present disclosure, however, are by no means limited to this specific sort of fabrication technique, and the principles described herein may similarly be applied to other sorts of methods used for producing any suitable electrical and/or electro-optical interconnects of any suitable system.

Although the embodiments described herein mainly address network transceiver interconnects (NTIs), the methods and devices described herein can also be used in other applications, such as in any cooling assembly of an electronic or electro-optic system or module.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A transceiver, comprising:
   a communication circuit, which is configured to exchange signals between a cable and a communication unit when the transceiver is connected to the communication unit; and
   a housing, comprising:
      a first shell comprising a substrate having the communication circuit disposed thereon;
      a second shell, which is configured to connect with the first shell for encapsulating the communication circuit, the second shell having an opening facing the communication circuit; and
   a base plate, which is a separate component from the second shell and is configured to be fitted in the opening, the base plate having a first surface having one or more cooling fins formed thereon, and a second surface, opposite the first surface, facing the communication circuit, wherein the base plate is configured to transfer heat between the communication circuit and the cooling fins.

2. The transceiver according to claim 1, wherein the base plate comprises a base plate assembly and wherein the cooling fins comprise zipper fins, which are coupled to the first surface and are configured to dissipate the heat generated by the communication circuit while exchanging the signals.

3. The transceiver according to claim 1, wherein the cooling fins comprise extruded fins, which are formed together with the first surface, and are configured to dissipate the heat generated by the communication circuit while exchanging the signals.

4. The transceiver according to claim 1, wherein a first thermal conductivity of the base plate is larger than a second thermal conductivity of the second shell.

5. The transceiver according to claim 1, wherein the signals comprise optical signals and electrical signals, and wherein the communication circuit comprises one or more electro-optical (EO) transducers configured to convert between the optical signals and the electrical signals.

6. The transceiver according to claim 5, and comprising thermal interface material disposed between at least one of the EO transducers and at least the base plate.

7. The transceiver according to claim 1, wherein the signals comprise electrical signals, and wherein the communication circuit comprises one or more integrated circuits (ICs) configured to exchange the electrical signals between the cable and the communication unit.

8. The transceiver according to claim 7, and comprising one or more additional substrates configured to receive the one or more ICs mounted thereon, and to exchange the electrical signals (i) between the one or more ICs, and (ii) between at least one of the one or more ICs and the communication unit.

9. The transceiver according to claim 8, and comprising interface material disposed between: (i) at least one of the one or more ICs, and (ii) at least one of (a) the base plate, (b) the first shell, and (c) the second shell.

10. The transceiver according to claim 1, and comprising a fastening mechanism that, when the base plate is fitted in the opening, is configured to attach and detach between the base plate and the second shell.

\* \* \* \* \*